(12) United States Patent
Huhtasalo

(10) Patent No.: US 10,068,167 B2
(45) Date of Patent: Sep. 4, 2018

(54) TRANSPARENT RADIO FREQUENCY IDENTIFICATION TRANSPONDER

(71) Applicant: SMARTRAC TECHNOLOGY FLETCHER, INC., Fletcher, NC (US)

(72) Inventor: Lauri Johannes Huhtasalo, Bangkok (TH)

(73) Assignee: SMARTRAC TECHNOLOGY FLETCHER, INC., Fletcher, NC (US)

( * ) Notice: Subject to any disclaimer, the term of this patent is extended or adjusted under 35 U.S.C. 154(b) by 0 days.

(21) Appl. No.: 14/994,014

(22) Filed: Jan. 12, 2016

(65) Prior Publication Data

US 2016/0203395 A1    Jul. 14, 2016
US 2017/0286819 A9    Oct. 5, 2017

Related U.S. Application Data

(63) Continuation-in-part of application No. 14/084,565, filed on Nov. 19, 2013, now Pat. No. 9,558,385, which is a continuation of application No. 13/350,665, filed on Jan. 13, 2012, now Pat. No. 8,587,436, which is a continuation of application No. 13/175,768, filed on Jul. 1, 2011, now Pat. No.

(Continued)

(51) Int. Cl.
*G06K 19/06* (2006.01)
*G06K 19/07* (2006.01)
*G06K 19/077* (2006.01)

(52) U.S. Cl.
CPC ..... *G06K 19/0723* (2013.01); *G06K 19/0776* (2013.01)

(58) Field of Classification Search
CPC ........... G06K 17/0723; G06K 17/0076; G06K 19/0723; G06K 19/00769; G06K 19/0776; G06K 19/07749; G06K 19/0775; G06K 19/07766; G06K 19/07777; G06K 19/07794
USPC ............................ 235/492; 340/572.1–572.8
See application file for complete search history.

(56) References Cited

U.S. PATENT DOCUMENTS 6,025,784 A    2/2000    Mish
6,222,452 B1 *  4/2001   Ahlstrom ........... G06K 19/0723
                                             340/568.1

(Continued)

FOREIGN PATENT DOCUMENTS

DE    10042805 A1    3/2002
JP    2003819809   *  7/2003

(Continued)

OTHER PUBLICATIONS

European Search Report dated Aug. 24, 2017 for corresponding EP Application 17154851.4 (6 pages).

*Primary Examiner* — Laura Gudorf
(74) *Attorney, Agent, or Firm* — Procopio

(57) ABSTRACT

A radio frequency identification (RFID) transponder that includes an RFID chip, a loop that is electrically connected to the RFID chip, and a substantially transparent antenna coupled to the loop. In various embodiments, the RFID transponder can be affixed over a light source (e.g., vehicle headlights) while preserving the luminance from the light source. Alternately or in addition, the RFID transponder can be affixed to a surface (e.g., product packaging, license plates) without obscuring any marks, designs, motifs, and/or text on the surface.

22 Claims, 4 Drawing Sheets

Related U.S. Application Data 8,237,568, which is a continuation of application No. 12/688,666, filed on Jan. 15, 2010, now Pat. No. 8,004,410, which is a continuation of application No. 11/279,912, filed on Apr. 17, 2006, now Pat. No. 7,671,746, which is a continuation of application No. 10/615,026, filed on Jul. 9, 2003, now Pat. No. 7,081,819.

(60) Provisional application No. 60/394,241, filed on Jul. 9, 2002, provisional application No. 62/102,529, filed on Jan. 12, 2015.

(56) References Cited

U.S. PATENT DOCUMENTS

| | | | | |
|---|---|---|---|---|
| 2004/0224135 | A1* | 11/2004 | Krebs | G06K 7/0008 428/195.1 |
| 2007/0279230 | A1* | 12/2007 | Lakeman | G06K 19/07749 340/572.7 |
| 2009/0146790 | A1* | 6/2009 | Speich | B65H 35/04 340/10.1 |
| 2010/0032487 | A1* | 2/2010 | Bohn | G06K 19/07749 235/492 |
| 2010/0048127 | A1* | 2/2010 | Stucki | G07C 9/00007 455/41.1 |
| 2010/0265041 | A1* | 10/2010 | Almog | G06K 19/07749 340/10.1 |
| 2012/0139558 | A1* | 6/2012 | Yang | G06K 19/07788 324/649 |
| 2013/0194148 | A1* | 8/2013 | Fontecchio | H01Q 1/2208 343/793 |
| 2013/0264390 | A1* | 10/2013 | Frey | H01Q 1/2225 235/492 |

FOREIGN PATENT DOCUMENTS

| | | | | |
|---|---|---|---|---|
| WO | | 9843104 A2 | 10/1998 | |
| WO | WO 2013158090 A1 * | | 10/2013 | G06K 19/07773 |

\* cited by examiner

TRANSPARENT RADIO FREQUENCY IDENTIFICATION TRANSPONDER

This application claims the benefit under 35 U.S.C. § 119(e) to U.S. Provisional Application No. 62/102,529, filed on Jan. 12, 2015, the disclosure of which is incorporated herein by reference in its entirety.

BACKGROUND

1. Technical Field

The various embodiments described herein are related to radio frequency identification (RFID), and more particularly to a transparent RFID transponder.

2. Related Art

RFID technology harnesses electromagnetic fields to transfer data wirelessly. One of the primary uses for RFID technology is the automatic identification and tracking of objects via RFID transponders, which may be attached or incorporated into a variety of objects. In fact, RFID technology has applications in numerous areas, including in for example, but not limited to, payment processing, asset management, and transportation. For example, many electronic toll collection (ETC) systems are implemented using RFID technology.

Conventional RFID transponders, however, are opaque. Thus, a conventional RFID transponder will obstruct the line-of-sight when it is placed over an object, such as a windshield. An opaque RFID transponder will also block light and thus may not be placed over crucial light source, such as vehicle headlights. In addition, opaque RFID transponders are generally unattractive and may obscure painstakingly designed product packaging. For at least these reasons, conventional RFID transponders may be unsuitable for a number of applications.

SUMMARY

A transparent RFID transponder is provided.

According to various embodiments, there is provided an RFID transponder. The RFID transponder may include an RFID chip, a loop that is electrically connected to the RFID chip, and a substantially transparent antenna coupled to the loop.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Figure 1:
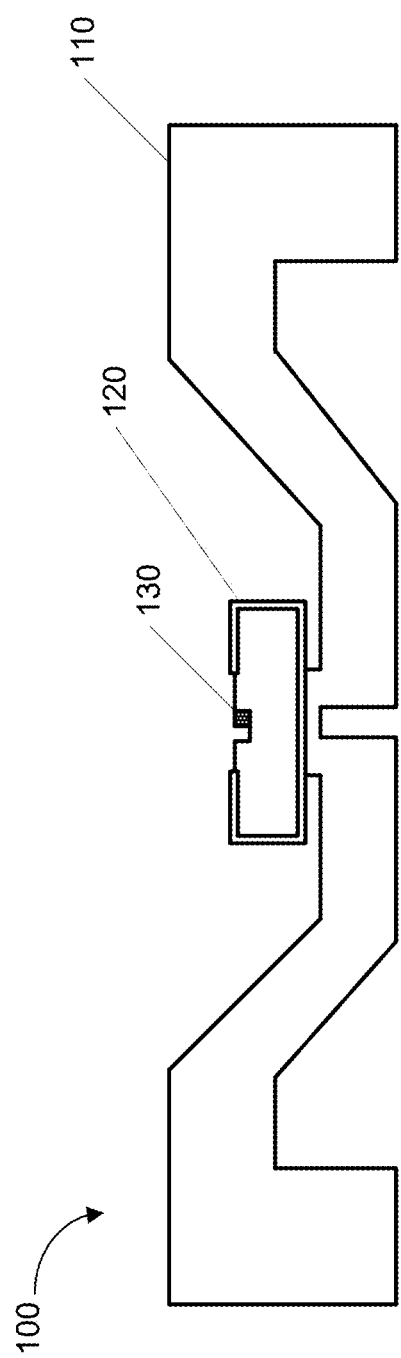
FIG. 1 illustrates a top view of a transparent RFID transponder according to various embodiments.

FIG. 1 illustrates a top view of a transparent RFID transponder 100 according to various embodiments. Referring to FIG. 1, the transparent RFID transponder 100 includes an antenna 110. In various embodiments, the antenna 110 is substantially transparent. For example, the antenna 110 can be constructed from a mesh of conductor lines that are sufficiently fine (e.g., 5-30 microns wide, 0.1 to 10 microns thick) and widely spaced (e.g., 100-200 micrometers apart) to render the conductor lines substantially invisible and/or transparent. Alternately, the antenna 110 can be constructed from a plurality of substantially transparent conductors that include, for example, but not limited to, poly (3, 4-ethylenedioxythiophene) (PEDOT) and indium tin oxide (ITO).

In various embodiments, the antenna 110 is coupled to a loop 120. The RFID loop 120 is electrically connected to an RFID chip 130. In various embodiments, the RFID chip 130 may support a certain frequency including, for example, but not limited to, ultra-high frequency (UHF) (e.g., 915 megahertz (MHz) or 800 MHz), high-frequency (HF), or near field communication (NFC) (e.g., 13.56 MHz).

As shown in FIG. 1, in some embodiments, the loop 120 is deposited directly on top of the antenna 110 and overlaps with the antenna 110. In some embodiments, the loop 120 is constructed out of a substantially transparent material. In other embodiments, the loop 120 is constructed out of a substantially opaque material but is sufficiently small (e.g., approximately 20 millimeters) to not pose a significant visual obstruction.

In various embodiments, access to the memory on the RFID chip 130 is granted based on a security key. The provision of secure identification solutions is described in U.S. Pat. Nos. 7,081,819, 7,671,746, 8,237,568, 8,325,044, and 8,004,410, the disclosures of which are incorporated by reference herein in their respective entirety.

Figure 2:
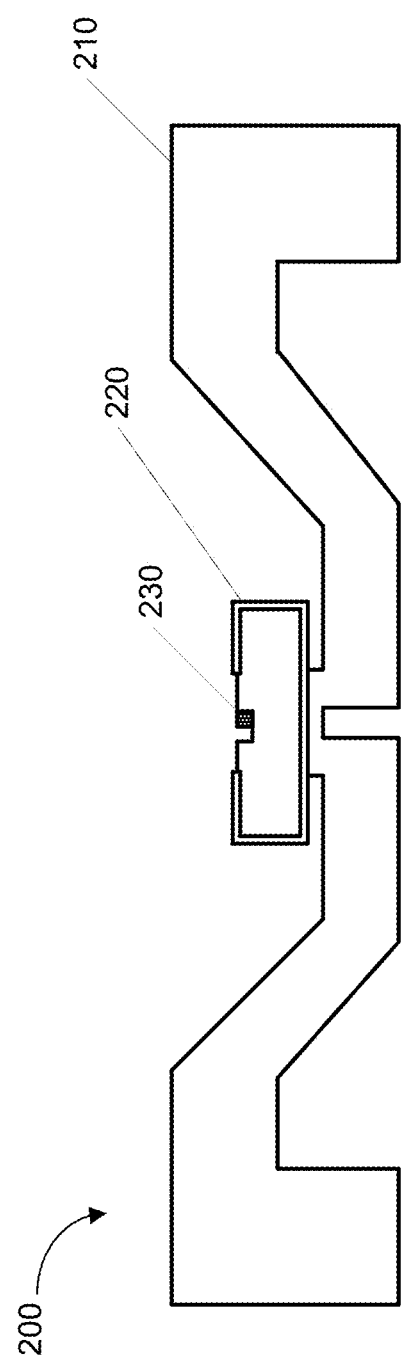
FIG. 2 illustrates a top view of a transparent RFID transponder according to various embodiments.

FIG. 2 illustrates a top view of a transparent RFID transponder 200 according to various embodiments. Referring to FIG. 2, the transparent RFID transponder 200 includes an antenna 210. In various embodiments, the antenna 210 is substantially transparent. For example, the antenna 110 can be constructed from a mesh of conductor lines that are sufficiently fine (e.g., 5-30 microns wide, 0.1 to 10 microns thick) and widely spaced (e.g., 100-200 micrometers apart) to render the conductor lines substantially invisible and/or transparent. Alternately, the antenna 210 can be constructed from a plurality of substantially transparent conductors that include, for example, but not limited to, PEDOT and ITO.

In various embodiments, the antenna 210 is coupled to a loop 220. The loop 220 is electrically connected to an RFID chip 230. In various embodiments, the RFID chip 230 is an UHF or an HF RFID chip. Moreover, in some embodiments, access to the memory on the RFID chip 230 is granted based on a security key. The provision of secure identification solutions is described in U.S. Pat. Nos. 7,081,819, 7,671,746, 8,237,568, 8,325,044, and 8,004,410, the disclosures of which are incorporated by reference herein in their respective entirety.

As shown in FIG. 2, in some embodiments, the loop 220 is deposited adjacent to the antenna 210 and does not overlap with the antenna 210. In some embodiments, the loop 220 is constructed out of a substantially transparent material. In other embodiments, the loop 220 is constructed out of a substantially opaque material but is sufficiently small (e.g., approximately 20 millimeters) to not pose a significant visual obstruction.

In various embodiments, the antenna 110 described with respect to FIG. 1 and the antenna 210 described with respect to FIG. 2 may be constructed using a variety of methods.

In various embodiments, instead of the combination of the loop 120 and the RFID chip 130, the transparent RFID transponder 100 may include an RFID strap coupled to the antenna 110. Similarly, the combination of the loop 220 and the RFID chip 230 in the transparent RFID transponder 200 may be replaced with an RFID strap coupled to the antenna 210. RFID straps are described in U.S. Reissued Pat. Nos. 44,165 and 43,488, the disclosures of which are incorporated by reference herein in their respective entirety.

In various embodiments, the transparent RFID transponder 100 and the transparent RFID transponder 200 may be configured to support multiple frequencies. For example, in some embodiments, the transparent RFID transponder 100 and/or the transparent RFID transponder 200 may support both UHF and HF (or NFC). Multi-frequency RFID transponders are described in Reissued U.S. Pat. Nos. RE 43,355 and RE 44,691, the disclosures of which are incorporated by reference herein in their respective entirety.

Some applications may require the placement of metallic material (e.g., retro-reflective material, holographic image) over the transparent RFID transponder 100 and/or the transparent RFID transponder 200. In order to preserve the transmission and reception capabilities of the transparent RFID transponder 100 and the transparent RFID transponder 200, a selective de-metallization process may be employed to treat the metallic material. Selective de-metallization is described in U.S. Pat. Nos. 7,034,688 and 7,463,154, the disclosures of which are incorporated by reference herein in their respective entirety.

Figure 3:
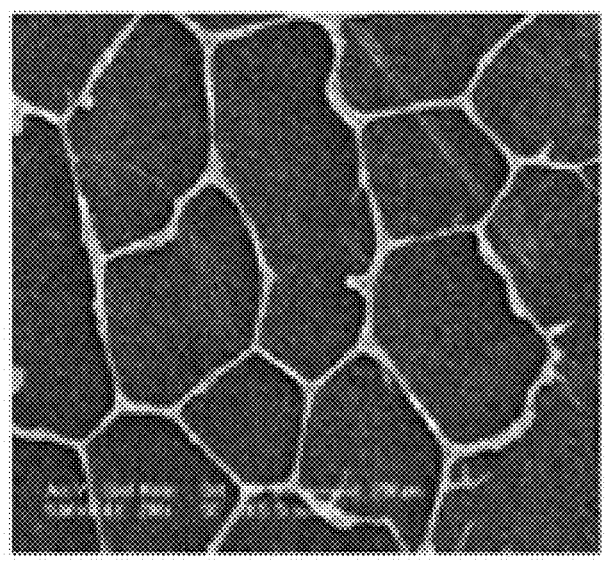
FIG. 3 illustrates transparent conductive mesh according to various embodiments.

FIG. 3 illustrates transparent conductive mesh 300 according to various embodiments. Referring to FIG. 3, in some embodiments, the transparent conductive mesh 300 can implement the antenna 110 described with respect to FIG. 1 and the antenna 210 described with respect to FIG. 2. As shown in FIG. 3, the transparent conductive mesh 300 can be constructed from a coated silver (Ag) mesh having high conductive and fine (e.g., 5-10 microns) Ag lines, such as the AC2ES Ultra-Thin EMI Shielding Film manufactured by ARC Technologies, Inc. of Amesbury, Mass.

In some embodiments, the antenna 110 described with respect to FIG. 1 and the antenna 210 described with respect to FIG. 2 may be constructed from a physical vapor deposited copper mesh, such as the UniBoss™ Flexible Embossed Conductor Film manufactured by UniPixel of The Woodlands, Tex.

In some embodiments, the antenna 110 described with respect to FIG. 1 and the antenna 210 described with respect to FIG. 2 may be constructed by printing the conductive mesh. For example, the conductive mesh may be printed using a variety of methods that includes, for example, but not limited to, ink jet printing, offset printing, and lithography.

In some embodiments, the antenna 110 described with respect to FIG. 1 and the antenna 210 described with respect to FIG. 2 may be constructed by depositing the conductive mesh using chemical vapor. Alternately, in some embodiments, the antenna 110 described with respect to FIG. 1 and the antenna 210 described with respect to FIG. 2 may be constructed by creating the conductive mesh subtractively from a solid film.

In some embodiments, the transparent RFID transponder 100 and the transparent RFID transponder 200 can be used to preserve the luminance from a light source. For example, the transparent RFID transponder 100 and the transparent RFID transponder 200 can affixed or incorporated onto the headlights of a vehicle.

In some embodiments, the transparent RFID transponder 100 and the transparent RFID transponder 200 can be used to preserve visibility. For example, the transparent RFID transponder 100 and the transparent RFID transponder 200 can be affixed or incorporated onto the windshield of a vehicle. The transparent RFID transponder 100 and the transparent RFID transponder 200 can also be affixed to a surface (e.g., product packaging, license plates) without obscuring any marks, designs, motifs, and/or text on the surface.

In some embodiments, the transparent RFID transponder 100 and the transparent RFID transponder 200 may be used to in one or more account management applications. For example, the transparent RFID transponder 100 or the transparent RFID transponder 200 may be applied to a vehicle and used in electronic tolling, parking access, and border control. At least some applications for the transparent RFID transponder 100 and the transparent RFID transponder 200 are described in U.S. patent Ser. No. 14/459,299, the disclosure of which is incorporated herein by reference in its entirety.

Figure 4:
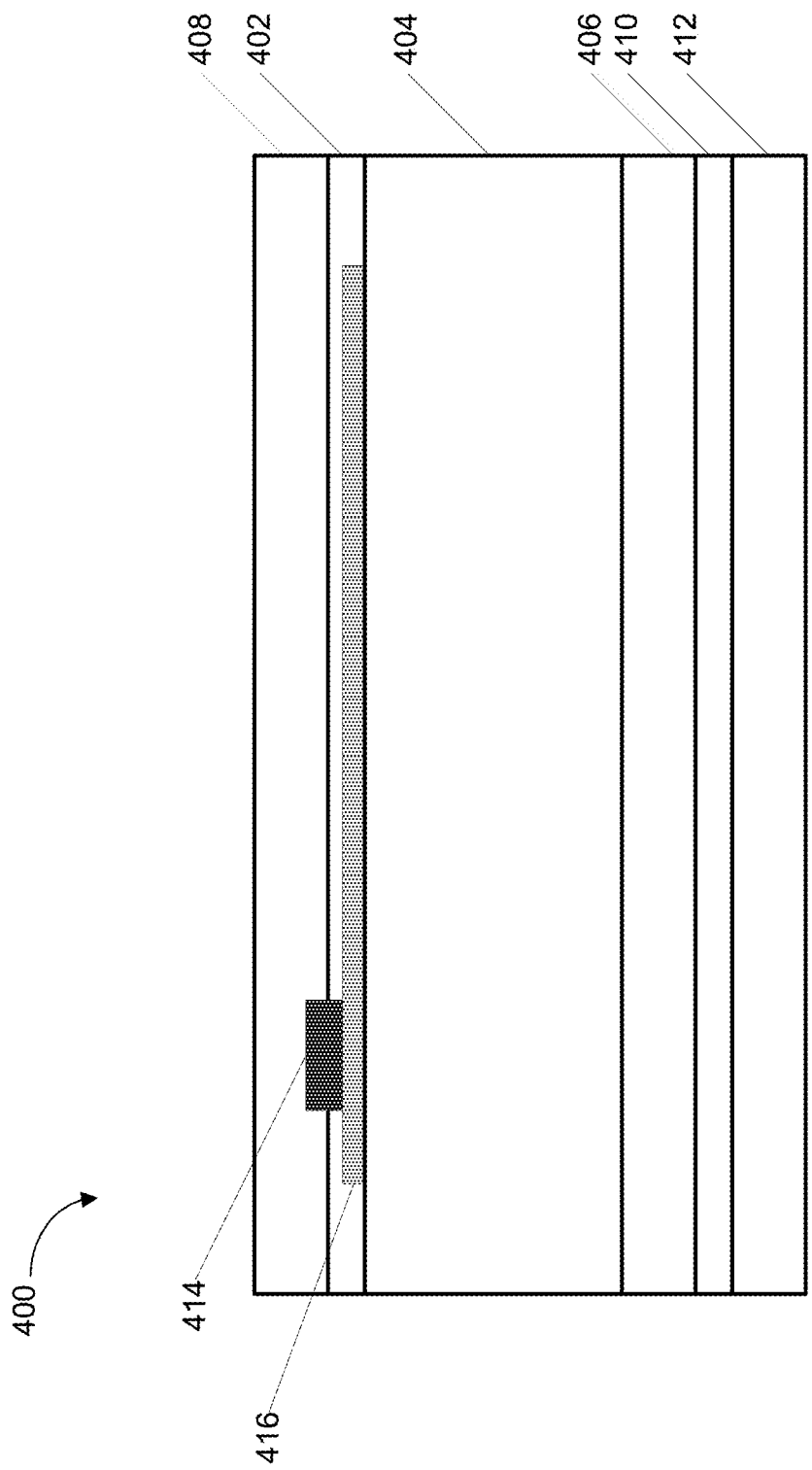
FIG. 4 illustrates a cross section of a transparent on-metal RFID transponder tag according to various embodiments.

FIG. 4 illustrates a cross section of an on-metal RFID transponder tag 400 according to various embodiments. Referring to FIGS. 1, 2, and 4, the on-metal RFID transponder tag 400 can include an RFID transponder 402.

In various embodiments, the RFID transponder 402 can be implemented using the transparent RFID transponder 100 described with respect to FIG. 1 or the transparent RFID transponder 200 described with respect to FIG. 2. As such, the RFID transponder 402 may include an RFID chip 414 and an antenna 416 that is substantially transparent. With reference to FIG. 4, the RFID transponder 402 can be layered on top of an insulation or spacer layer 404.

The on-metal RFID transponder tag 400 can include one or more additional conductive layers. As shown in FIG. 4, the on-metal RFID transponder tag 400 can include a first transparent conductive mesh 406, which is layered beneath the spacer layer 404. In some embodiments, in addition to the first transparent conductive mesh 406, a second transparent conductive mesh 408 can be layered on top of the RFID transponder 402. The second transparent conductive mesh 408 can be an optional feature to provide additional protection for the RFID transponder 402.

The on-metal RFID transponder tag 400 can further include backing adhesive 410 and a liner 412. In various embodiments, the liner 412 is removed to expose the backing adhesive 410 in order to affix the on-metal RFID transponder tag 400 to a surface (e.g., license plate, windshield, product packaging, light source etc.).

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A radio frequency identification (RFID) transponder, comprising:
an RFID chip;
a loop that is electrically connected to the RFID chip; and
a substantially transparent antenna coupled to the loop, wherein the loop is deposited directly on top of the antenna and overlaps with the antenna.

2. The RFID transponder of claim 1, wherein the RFID chip comprises an ultra-high frequency (UHF) RFID chip.

3. The RFID transponder of claim 1, wherein the RFID chip comprises a high-frequency (HF) or a near field communication (NFC) chip.

4. The RFID transponder of claim 1, wherein the RFID chip is adapted to support a plurality of frequencies.

5. The RFID transponder of claim 1, wherein the loop comprises a substantially transparent material.

6. The RFID transponder of claim 1, wherein the loop comprises a substantially opaque material.

7. The RFID transponder of claim 1, wherein the antenna comprises conductive mesh.

8. The RFID transponder of claim 7, wherein the conductive mesh comprises coated silver mesh.

9. The RFID transponder of claim 7, wherein the conductive mesh comprises physical vapor deposited copper.

10. The RFID transponder of claim 7, wherein the conductive mesh is deposited using one of the following: ink jet printing, offset printing, and lithography.

11. The RFID transponder of claim 7, wherein the conductive mesh is deposited via chemical vapor.

12. The RFID transponder of claim 7, wherein the conductive mesh is created subtractively from a solid film.

13. The RFID transponder of claim 7, wherein the conductive mesh comprises transparent conductors.

14. The RFID transponder of claim 1, wherein the antenna comprises a plurality of transparent conductors.

15. The RFID transponder of claim 14, wherein the plurality of transparent conductors comprises at least one conductor constructed from poly (3, 4-ethylenedioxythiophene) (PEDOT).

16. The RFID transponder of claim 14, wherein the plurality of transparent conductors comprises at least one conductor constructed from indium tin oxide (ITO).

17. An on-metal RFID transponder tag comprising:
the RFID transponder comprising:
- an RFID chip;
- a loop that is electrically connected to the RFID chip; and
- a substantially transparent antenna coupled to the loop, wherein the loop is deposited directly on top of the antenna and overlaps with the antenna;

a conductive first layer comprising conductive mesh; and
a second layer comprising an insulator and positioned between the RFID transponder and the first layer comprising the conductive mesh.

18. The on-metal RFID transponder tag of claim 17, further comprising a conductive third layer comprising conductive mesh, wherein the conductive third layer is a protective layer deposited over the RFID transponder.

19. The on-metal RFID transponder tag of claim 17, further comprising a fourth layer comprising an adhesive.

20. The on-metal RFID transponder of claim 19, further comprising a fifth layer comprising a liner.

21. The on-metal RFID transponder tag of claim 18, wherein the conductive third layer is positioned on a side of the RFID transponder opposite to the conductive first layer and the second layer.

22. The on-metal RFID transponder tag of claim 18, wherein both the conductive first layer and the conductive third layer are transparent layers.

* * * * *